United States Patent
Aichele et al.

(10) Patent No.: US 9,656,203 B2
(45) Date of Patent: May 23, 2017

(54) FLUORINATED SURFACTANTS AND STABILIZATION OF POLYTETRAFLUOROETHYLENE (PTFE) PARTICLES IN HOLLOW FIBER SPIN SOLUTIONS

(71) Applicant: Phillips 66 Company, Houston, TX (US)

(72) Inventors: Clint P. Aichele, Stillwater, OK (US); Imona C. Omole, Midland, TX (US)

(73) Assignee: Phillips 66 Company, Houston, TX (US)

( * ) Notice: Subject to any disclaimer, the term of this patent is extended or adjusted under 35 U.S.C. 154(b) by 783 days.

(21) Appl. No.: 13/974,671

(22) Filed: Aug. 23, 2013

(65) Prior Publication Data

US 2014/0096682 A1 Apr. 10, 2014

Related U.S. Application Data

(60) Provisional application No. 61/697,959, filed on Oct. 4, 2012.

(51) Int. Cl.
| | |
|---|---|
| *D01D 5/24* | (2006.01) |
| *D01F 1/08* | (2006.01) |
| *B01D 53/18* | (2006.01) |
| *B01D 53/14* | (2006.01) |
| *B29D 23/00* | (2006.01) |
| *C08J 7/04* | (2006.01) |
| *C08J 3/00* | (2006.01) |
| *B01D 53/22* | (2006.01) |

(52) U.S. Cl.
CPC ....... *B01D 53/185* (2013.01); *B01D 53/1425* (2013.01); *B01D 53/1462* (2013.01); *B01D 53/1475* (2013.01); *B01D 53/229* (2013.01); *B29D 23/00* (2013.01); *C08J 3/005* (2013.01); *C08J 7/04* (2013.01); *C08J 2381/06* (2013.01); *C08J 2427/18* (2013.01); *Y02C 10/06* (2013.01); *Y02P 20/152* (2015.11)

(58) Field of Classification Search
None
See application file for complete search history.

(56) References Cited

U.S. PATENT DOCUMENTS

| | | |
|---|---|---|
| 4,985,190 A | 1/1991 | Ishikawa et al. |
| 6,498,207 B1 | 12/2002 | Hoshikawa et al. |
| 6,663,805 B1 | 12/2003 | Ekiner et al. |

(Continued)

*Primary Examiner* — Christopher P Jones
*Assistant Examiner* — Phillip Shao
(74) *Attorney, Agent, or Firm* — Phillips 66 Company (57) ABSTRACT

Methods and apparatus relate to recovery of carbon dioxide and/or hydrogen sulfide from a gas mixture. Separating of the carbon dioxide, for example, from the gas mixture utilizes a liquid sorbent for the carbon dioxide. The liquid sorbent contacts the gas mixture for transfer of the carbon dioxide from the gas mixture to the liquid sorbent. Contacting of the sorbent with the gas mixture and/or desorption of the carbon dioxide from the liquid sorbent utilize hollow fiber contactors that have permeable walls and incorporate particles distinct from a remainder of the walls to influence wetting properties of the contactors. Polytetrafluoroethylene particles may be homogenously disposed throughout hollow fiber contactors to influence wetting properties of the contactors.

12 Claims, 6 Drawing Sheets

(56) References Cited

U.S. PATENT DOCUMENTS

| | | | |
|---|---|---|---|
| 6,802,972 B1 * | 10/2004 | Cheng | D01F 6/32 210/500.23 |
| 6,841,594 B2 | 1/2005 | Jones et al. | |
| 6,861,466 B2 | 3/2005 | Dadalas et al. | |
| 7,347,960 B2 | 3/2008 | Jones | |
| 7,872,073 B2 | 1/2011 | Jones | |
| 7,985,361 B2 | 7/2011 | Flowers et al. | |
| 2009/0211522 A1 | 8/2009 | Perl et al. | |
| 2009/0297850 A1 | 12/2009 | Jung | |
| 2010/0323277 A1 | 12/2010 | Roberts | |
| 2012/0285320 A1 * | 11/2012 | Heald | B01D 53/228 95/49 |

* cited by examiner

FLUORINATED SURFACTANTS AND STABILIZATION OF POLYTETRAFLUOROETHYLENE (PTFE) PARTICLES IN HOLLOW FIBER SPIN SOLUTIONS

CROSS-REFERENCE TO RELATED APPLICATIONS

This application is a non-provisional application which claims benefit under 35 USC§119(e) to U.S. Provisional Application Ser. No 61/697,959 filed Oct. 4, 2012, entitled FLUORINATED SURFACTANTS AND STABILIZATION OF POLYTETRAFLUOROETHYLENE PARTICLES IN HOLLOW FIBER SPIN SOLUTIONS, which is incorporated herein in its entirety.

STATEMENT REGARDING FEDERALLY SPONSORED RESEARCH OR DEVELOPMENT

None

FIELD OF THE INVENTION

Embodiments of the invention relate to stabilizing polytetrafluoroethylene particles in hollow fiber spin solutions by adding a fluorinated surfactant.

BACKGROUND OF THE INVENTION

Reducing greenhouse gas emissions in various industrial processes requires viable carbon dioxide mitigation strategies. Capture of the carbon dioxide depends on the ability to separate the carbon dioxide from a mixture, which enables transport of the carbon dioxide and subsequent handling or sequestering of the carbon dioxide.

Factors making techniques more deployable for separating carbon dioxide include reducing costs, reducing energy requirements, and reducing the foot-print of the methods utilized during employment of the techniques. Separation approaches such as distillation are unattractive because of these reasons. Absorption processes may utilize a sorbent to remove carbon dioxide from the mixture followed by regeneration of the sorbent to liberate the carbon dioxide. Prior absorption units utilize columns or towers for direct contacting of the mixture with an absorbent fluid such as an aqueous amine. However, percentage of the carbon dioxide within the mixture and/or amount of the carbon dioxide removed dictate size, operating expense and capital expense of the units. Viability of these absorption units, which may contain inefficient mass transfer devices such as trays, begins to diminish as the amount of the gas to be separated scales up.

Therefore, a need exists for improvement of structures and methods related to hollow contact fibers and their use in gas absorption systems, such as in carbon dioxide separation systems.

BRIEF SUMMARY OF THE DISCLOSURE

A method of employing a fluorinated surfactant to achieve stabilization of polytetrafluoroethylene particles in a hollow fiber spin solution may include mixing a plurality of polytetrafluoroethylene particles into a polymer matrix, mixing NMP into the polytetrafluoroethylene particles and the polymer matrix, and mixing a fluorinated surfactant into the NMP, the plurality of polytetrafluoroethylene particles and the polymer matrix to form a composition. The surfactant facilitates homogeneous dispersion of the polytetrafluoroethylene particles in the polymer matrix, which may be a polysulfone. The polytetrafluoroethylene particles may be about 5 wt. %, the polymer matrix may be about 25 wt. %, the fluorinated surfactant may be about 1 wt. %, and the NMP may be about 69 wt. % in the composition. Subsequent to adding the surfactant and further mixing, spinning the composition doped with the polytetrafluoroethylene particles into a plurality of hollow fiber contactors may be performed, which may then be bundled into modules (e.g. as in a shell and tube exchanger) to form sorption and desorption units. The method may then include passing a gas containing at least one of carbon dioxide and hydrogen sulfide along the plurality of hollow fiber contactors; and passing a liquid sorbent for at least one of the carbon dioxide and the hydrogen sulfide along the contactors such that contacting of the gas and the liquid sorbent to treat the gas occurs across walls of the plurality of hollow fiber contactors. The hollow fiber contactors incorporate particles such as polytetrafluoroethylene that are distinct in composition from a remainder of the walls to influence wetting properties of the hollow fiber contactors. Spinning the composition with the polytetrafluoroethylene particles results in the creation of hollow fiber contactors with homogeneously dispersed polytetrafluoroethylene particles.

BRIEF DESCRIPTION OF THE DRAWINGS

A more complete understanding of the present invention and benefits thereof may be acquired by referring to the following description taken in conjunction with the accompanying drawings.

DETAILED DESCRIPTION

Teachings of the present disclosure, which includes and will be explained in conjunction with FIGS. 1-8, relate to recovery of carbon dioxide ($CO_2$) from a gas mixture using a hollow fiber that has polytetrafluoroethylene (PTFE) particles dispersed throughout the material of the hollow fiber. The gas mixture may be flue gas or natural gas that may be recovered as hydrocarbon production from a sour gas field. The present teachings also relate to a proposed method of making hollow fibers using a fluorinated surfactant to homogeneously disperse PTFE particles throughout a polymer matrix used as part of a hollow fiber. While described herein with respect to carbon dioxide recovery, systems and methods disclosed may also enable hydrogen sulfide ($H_2S$) recovery along with carbon dioxide or in a same manner as carbon dioxide recovery, if hydrogen sulfide is present in the gas mixture either with or without the carbon dioxide. Separation of the carbon dioxide, or even hydrogen sulfide, from the gas mixture utilizes a liquid sorbent to capture the carbon dioxide or hydrogen sulfide.

The liquid sorbent contacts the gas mixture for transfer of the carbon dioxide from the gas mixture to the liquid sorbent, which may be one or more aqueous amine solutions or ionic liquids. The carbon dioxide then desorbs from the liquid sorbent upon heating of the liquid sorbent. Contacting of the sorbent with the gas mixture and/or desorption of the carbon dioxide from the liquid sorbent utilize hollow fiber contactors that have permeable walls and incorporate particles distinct from a remainder of the walls to influence wetting properties of the contactors. The particles may also be PTFE particles that are dispersed within and throughout the hollow fibers by using a fluorinated surfactant, which may be a viscous liquid, to disperse the PTFE particles into polymer spin solutions that are used to fabricate or manufacture the hollow fibers. One advantage of using hollow fibers, such as asymmetric hollow fibers, with fluorinated particles homogeneously dispersed throughout a cross-section and length of the hollow fiber may be an increase in breakthrough pressure in aggressive solvent environments without compromising high gas transfer rates.

Figure 1:
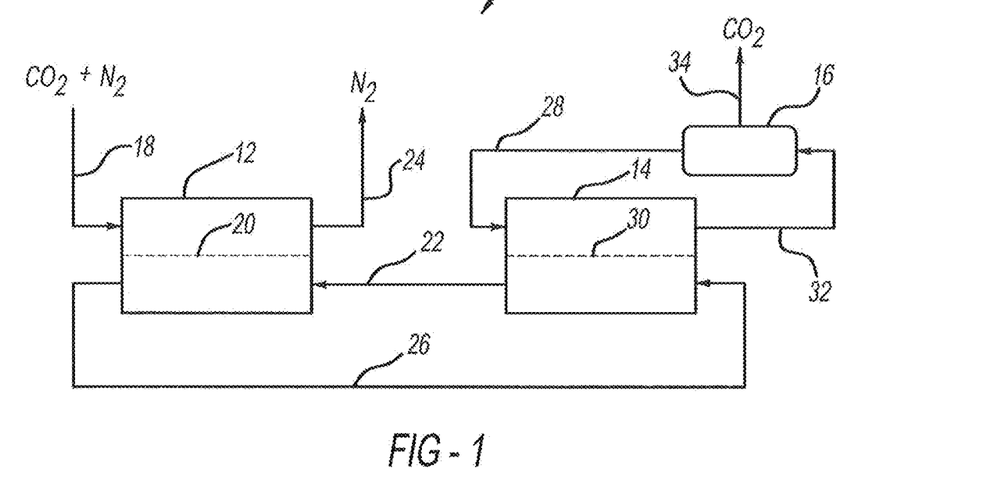
FIG. 1 is a schematic of a contactor system utilizing fluorinated hollow fiber contactors having modified wetting properties in sorption and desorption units for separating carbon dioxide from a gas mixture, according teachings of the present disclosure.

FIG. 1 depicts a schematic diagram of a contactor system 10 including a sorption unit 12 and a desorption unit 14 coupled to a condenser and steam generator 16. In operation, a gas mixture 18, such as flue gas that contains nitrogen ($N_2$) and carbon dioxide ($CO_2$), enters sorption unit 12. Gas mixture 18 passes through sorption unit 12 along a flow path defined by a plurality of hollow fiber sorption contactors 20 (represented by a dotted line) that enable contact of gas mixture 18 with a liquid stream of lean sorbent 22 passing through sorption unit 12. With reference also including FIG. 2, carbon dioxide in gas mixture 18 diffuses across hollow fiber sorption contactors 20 thereby reducing the concentration of the carbon dioxide in a treated output 24 from sorption unit 12 relative to the concentration of the carbon dioxide in gas mixture 18 that is input into sorption unit 12. Lean sorbent 22 that sorbs the carbon dioxide transferred completely through a wall of sorption contactors 20 exits sorption unit 12 as rich sorbent 26 for inputting into desorption unit 14.

As depicted in FIG. 1, within sorption unit 12, gas mixture 18 may flow in a direction opposite to (e.g. counter currently) a direction of lean sorbent 22. In other words, gas mixture 18 and lean sorbent 22 may flow toward each other. As an example, the directional flows of gas mixture 18 and lean sorbent 22 may be opposed by 180 degrees. An advantage of such opposing fluid flows is that removal of carbon dioxide through wall of hollow fiber 36 is more efficient, relative to an arrangement where gas mixture 18 and lean sorbent 22 flow in the same direction within sorption unit 12. A variety of relative flow arrangements within sorption unit 12 are conceivable, such as fluids with flows in opposing directions and fluids flowing in the same direction at the same or different velocities.

With reference again including FIG. 1, steam 28 passes through desorption unit 14 along a flow path defined by a plurality of hollow fiber desorption contactors 30 (represented by a dotted line) that enable contact of rich sorbent 26 with steam 28. Within desorption unit 14, steam 28 may flow counter-currently, that is, in a direction opposite that of a direction of rich sorbent 26. In other words, steam 28 and rich sorbent 26 may flow toward each other. As an example, the directional flows of steam 28 and rich sorbent 26 may be opposed by 180 degrees. An advantage of such opposing fluid flows is that removal of carbon dioxide through walls of hollow fiber 36 is more efficient, relative to an arrangement where steam 28 and rich sorbent 26 flow in the same direction within desorption unit 14. Oppositely arranged flows increase the approach velocity (e.g. relative approach velocity) of each fluid and permit increased passing of volumes of the fluids over point(s) along a wall of hollow fiber 36, and thus the transfer of carbon dioxide from rich sorbent 26 to a mixture of steam and carbon dioxide 32, which exits desorption unit 14 thus resulting in a stream of lean sorbent 22 from desorption unit 14.

Heat transfer from steam 28 across desorption contactors 30 liberates carbon dioxide from rich sorbent 26 in a process of regenerating lean sorbent 22 supplied to sorption unit 12. Steam 28, and carbon dioxide transferred into the flow of steam 28, exit desorption unit 14 as a combined vapor stream 32 input into a condenser and steam generator 16. In condenser and steam generator 16, the carbon dioxide separates from liquid water upon cooling of combined vapor stream 32 and steam condensate. Overhead of the carbon dioxide separated from the water forms a recovered carbon dioxide output 34. Subsequent heating of the water by condenser and steam generator 16 produces steam 28 that is recycled for inputting into desorption unit 14. Hollow fiber 36 depicted in FIG. 2, represents a hollow fiber that may be used in sorption unit 12 as one of a plurality of sorption contactors 20 and in desorption unit 14 as one of a plurality of desorption contactors 30.

Conventional passing of amines through a re-boiler for regeneration increases corrosion and corrosion related problems compared to use of desorption unit 14 with rich sorbent 26 in contact with desorption contactors 30 that are less prone to corrosion. Further, sorption unit 12 and desorption unit 14 provide less sensitivity to motion and orientation that influence prior contacting approaches. Sorption unit 12 and desorption unit 14 thus function in applications including floating facilities that can move during operation.

Figure 2:
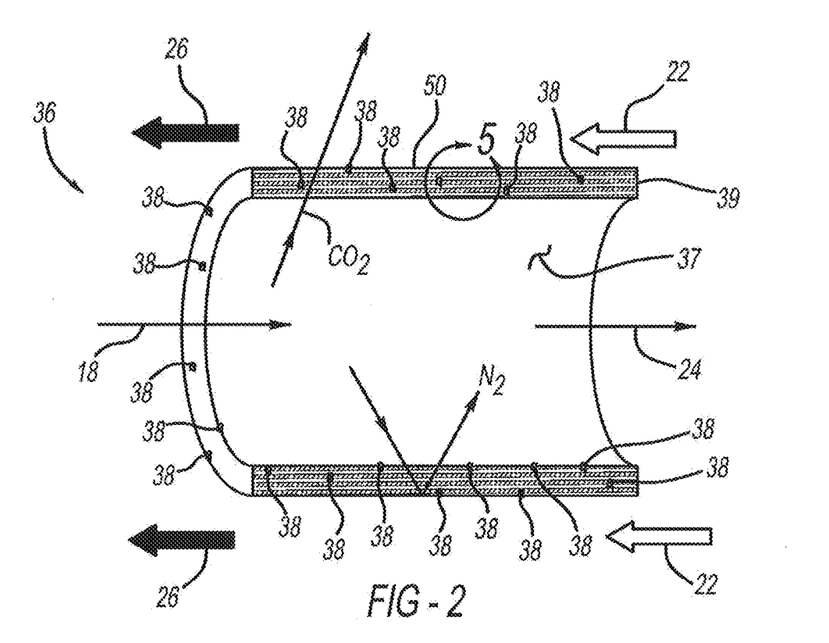
FIG. 2 is a longitudinal cross-sectional representation of one of the fluorinated hollow fiber contactors that includes fluorinated particles to provide modified wetting properties, according teachings of the present disclosure.

FIG. 2 depicts an enlarged cross-sectional section of a hollow fiber 36 referred to herein as a hollow fiber due to having a cylindrical structure with an open interior bore 37 and a diameter between about 200 microns and about 2 millimeters. Since a wall of hollow fiber 36 is permeable to gas, contacting as described herein occurs through pores (e.g. voids) in a wall of hollow fiber 36. Sizes of the pores in hollow fiber 36 may range from about 0.1 nanometers to 1000 nanometers.

Multiple lengths of hollow fiber 36 assembled, joined, fused or connected together may exemplify contactors 20, 30 disposed in units 12, 14 depicted in FIG. 1. For example, gas mixture 18 containing carbon dioxide may flow through interior bore 37 of hollow fiber 36 without being dispersed in lean sorbent 22 flowing along an exterior of hollow fiber 36 and used for sorption of carbon dioxide. In some embodiments, lean sorbent 22 may flow through the interior bore 37 of hollow fiber 36 without being dispersed in gas mixture 18 containing carbon dioxide flowing along the exterior of hollow fiber 36. Depending upon the application and arrangement of hollow fiber 36, nitrogen and carbon dioxide may flow to or toward the exterior of the hollow fiber 36 from an interior bore 37, or it may be possible that nitrogen and carbon dioxide exists outside hollow fiber 36 and flow from the exterior of hollow fiber 36 to or toward interior bore 37 of hollow fiber 36.

Packing density for multiple lengths of hollow fiber 36 and surface area of hollow fiber 36 enable efficient contacting. Compared with conventional packing that may provide only 250 square meters per cubic meter ($m^2/m^3$), hollow fiber 36 may achieve surface areas of 1500 $m^2/m^3$ or more. The relative increase in surface area aides in reducing size and weight of equipment required for contacting.

Figure 5:
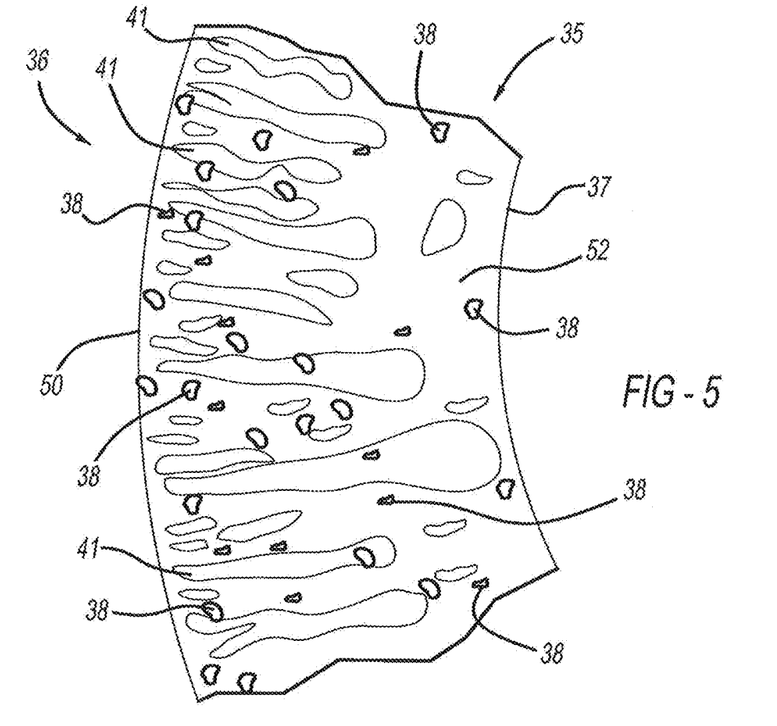
FIG. 5 is a schematic view of a wall section of the hollow fiber membrane taken at area 5 of FIG. 2, according teachings of the present disclosure.

Pore size and hydrophobic properties of hollow fiber 36 maintain separation of a bulk gas phase (e.g., gas mixture 18) from a bulk liquid phase (e.g., lean sorbent 22). This non-dispersive flow through sorption unit 12 or desorption unit 14 avoids problematic issues including flooding, entrainment, channeling and foaming that often occur with dispersive contacting. The non-dispersive flow further enables control of gas and/or liquid flow rates without limitations of fluid-mechanics within towers that utilize the dispersive contacting. The hydrophobic properties and the pore size of hollow fiber 36 help prevent liquids, such as lean sorbent 22, from entering hollow fiber 36 since sorbents are usually aqueous. As described herein, a particulate 38, also referred to as a particle 38, altering a body interior and/or a surface of hollow fiber 36 contributes to the hydrophobic properties of hollow fiber 36. Avoiding such liquid penetration or wetting of hollow fiber 36 ensures that a stagnant liquid layer within pores of hollow fiber 36 does not obstruct transport of carbon dioxide through the wall 39 of hollow fiber 36 since continuous flow otherwise replenishes fresh liquid flowing along, over and through hollow fiber 36. While the pore size of hollow fiber 36 must be large enough to permit efficient passage of carbon dioxide, limiting the pore size at least at the skin layer 50 where liquids contact hollow fiber 36 inhibits the wetting. FIG. 5 depicts how voids or pores 41 do not break through an exterior skin layer of hollow fiber 36. The pore size and porosity however also influence gas throughput and mass transfer resistance of the carbon dioxide across hollow fiber 36. Increasing the pore size and/or the porosity along substructure 52 where gas contacts hollow fiber 36 reduces the mass transfer resistance as desired even though the pore size and/or the porosity may not be able to be increased as much at skin layer 50 without causing pore wetting problems. Substructure 52 provides physical integrity for hollow fiber 36 such that skin layer 50 may have a limited thickness relied on only to prevent liquid breakthrough while maintaining high gas throughput.

In some embodiments, a hydrophobic polymeric material that can be processed into the hollow fiber forms hollow fiber 36, such as its substructure. For example, one suitable material that may form hollow fiber 36 may dissolve in a spinning solvent, be cast into hollow fiber 36 and be compatible with sorbent formulations desired for use in removing the carbon dioxide. Various exemplary compositions of polymers that may form hollow fiber 36 satisfy foregoing criteria and include but are not limited to polysulfones (PSU or PSF), polyimides, polyethers, polycarbonates, fluoropolymers, or polymers of amides with various other constituent monomer combinations.

Polysulfones describe a family of thermoplastic polymers that are known for their toughness and stability at high temperatures and have a relatively high service temperature compared to other melt-processable thermoplastics. Moreover, polysulfones may have high hydrolysis stability which permits use in environments involving steam, such as removal of carbon dioxide in a gas separation process in accordance with teachings of the present disclosure. Polysulfones allow easy manufacturing of hollow membranes, with reproducible properties and controllable size of pores, such as 40 nanometers or smaller.

A fluorinated surfactant may be employed during fiber manufacturing or construction to disperse PTFE particles into polymer spin solutions used to manufacture hollow fiber 36. One advantage of a hollow fiber contactor made by employing a fluorinated surfactant to disperse PTFE particles into polymer spin solutions so that PTFE particles are dispersed homogenously throughout hollow fiber 36 is that hollow fiber 36 has the potential to decrease the required area (e.g. necessary volume or space needed to absorb or de-sorb an acceptable amount of carbon dioxide or other gases) dramatically in a situation where hollow fiber 36 is employed for capturing carbon dioxide. By reducing the required area by employing non-wetted hollow fiber 36, capital costs may be reduced. Because relatively low solvent wetting tendencies of hollow fibers is desired in applications involving the removal of carbon dioxide, the fluorinated surfactant mentioned above is employed. That is, a fluorinated surfactant homogeneously distributes PTFE particles into polymer solutions by attaching partially to PTFE particles and partially to the polymer matrix used to spin hollow fiber 36. The fluorinated surfactant delivers the PTFE particles to the surface of the hollow fiber that is exposed to solvent flow. Moreover, the fluorinated surfactant facilitates adequate mixing and produces hollow fibers that resist solvent wetting. The fluorinated surfactant, when mixed with a polymer matrix, PTFE particles and NMP, lowers surface energy, which has the advantage of facilitating contact of PTFE particles.

In one example of the present teachings, a surfactant may have both, fluoro and polar functionalities. PTFE particles 38 dispersed throughout hollow fiber 36 of the present teachings may also prevent solvent wetting of hollow fiber 36 because PTFE repels solvents or at least has relatively low wetting characteristics. As part of manufacturing of hollow fiber 36, the surfactant used may remain in the polymer matrix or the surfactant may be removed with the solvent upon fabrication of hollow fiber 36.

Figure 3:
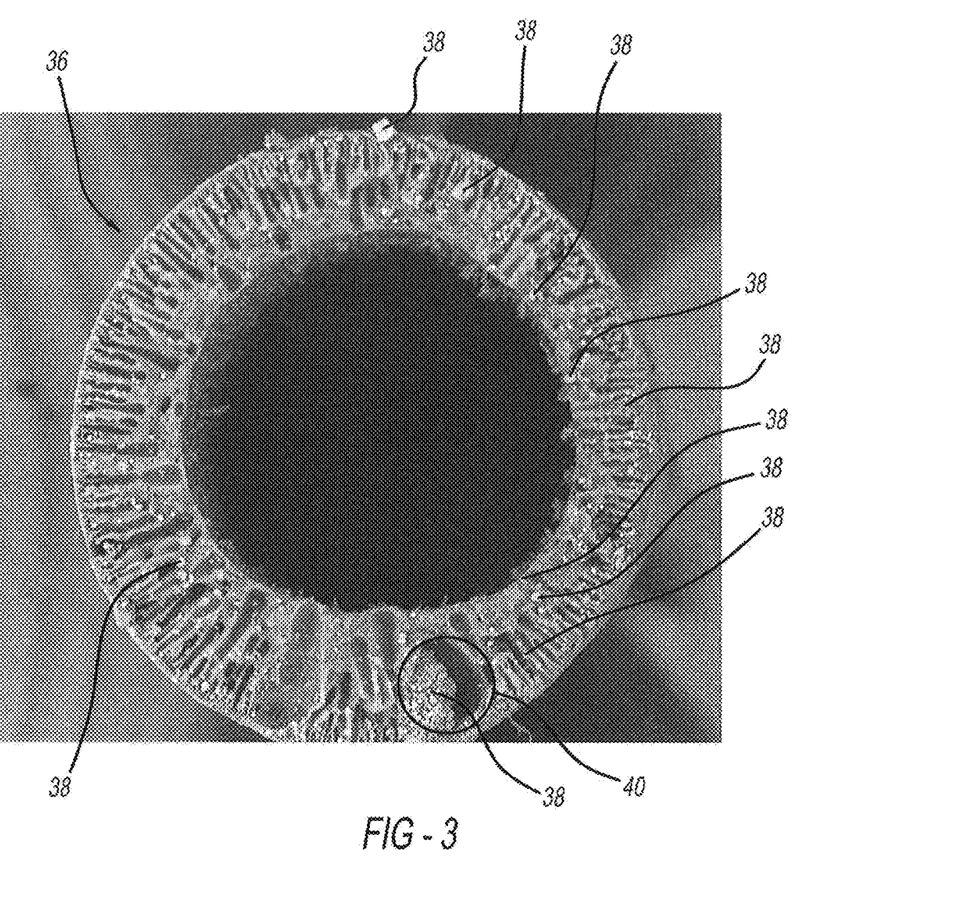
FIG. 3 is a transverse cross-sectional representation of one of the fluorinated hollow fiber contactors that includes fluorinated particles to provide modified wetting properties, according teachings of the present disclosure.

In accordance with teachings of the present disclosure, thin films consisting of PTFE particles and polymer indicate that the contact angle of 30 wt. % MEA can be increased from 80 degrees to 150 degrees. This behavior indicates that PTFE particles may reduce solvent wetting of hollow fiber contactors, such as hollow fiber 36. FIG. 3 depicts how the surfactant may homogenously disperse PTFE material, also known as PTFE particulate 38, throughout the polymer matrix that forms hollow fiber 36. FIG. 3 depicts how multiple particles 38 may be grouped, such as at area 40, while some areas indicate how particles 38 may be spread out or traverse from an inside diameter to an outside diameter of hollow fiber 36 in an even, consistent or homogenous arrangement.

Figure 4:
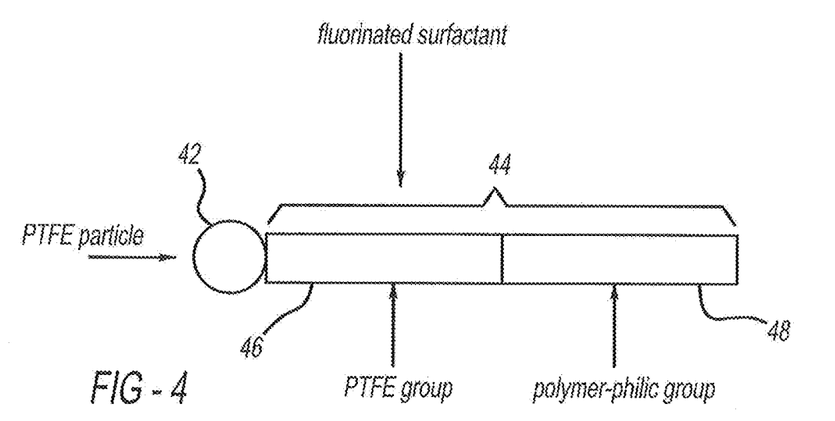
FIG. 4 is an enlarged diagrammatic view of a section of the fluorinated hollow fiber contactor that includes a fluorinated particle to provide modified wetting properties, according teachings of the present disclosure.

FIG. 4 is a sub-micro scale depiction of an example of a PTFE particle 42 bonding to a fluorinated surfactant 44, which may have a PTFE group portion 46 and a polymer-philic group portion 48. In FIG. 4, PTFE group portion 46 has a similar or same chemical and functional relationship as PTFE particle 42. Polymer-philic group portion 48 has a similar or same chemical and functional relationship as a polymer that forms the hollow fiber. Thus, when PTFE 42 is mixed in relation with the surfactant then the surfactant migrates through the solution and disperses the PTFE 42 throughout the solution.

FIG. 5 depicts morphological asymmetry in an example of a wall cross-section 35 of hollow fiber 36 taken at area "5" of FIG. 2. Wall cross-section 35 may include a skin layer 50 and a porous substructure 52 section, which essentially is a different morphology from the skin layer. As discussed further herein, a common material may form skin layer 50 and substructure 52 during fabrication, which may facilitate forming of the asymmetry for control of mass transfer through hollow fiber 36 and liquid wetting, and limiting thereof, of hollow fiber 36.

For some embodiments, wall thickness of hollow fiber 36 only where the pore size prevents wetting defines skin layer 50, which may be between 0.01 microns and 1 micron thick. The substructure 52 provides a remainder of the wall thickness that has pores that are too large to prevent wetting. Overall the wall thickness of hollow fiber 36 in some embodiments may range from 10 micron to 500 microns.

For some embodiments, a spinning process is used to fabricate hollow fiber 36 from an extrusion mixture of the polymer material (e.g., polysulfone) and the solvent for the polymer, through a concentric annular die called a spinneret, and into a quench bath that contains non-solvent for the polymer such that phase-separation is induced at the exterior of hollow fiber, facilitating forming of the asymmetry with the skin layer on the exterior side of the hollow fiber.

For some embodiments, a spinning process fabricates hollow fiber 36 from an extrusion mixture of the polymer (e.g., the polysulfone), the solvent for the polymer and an additive that is more volatile than the solvent to facilitate forming of the asymmetry to control the mass transfer through hollow fiber 36 and the wetting of hollow fiber 36. The additive differs in composition from the solvent even though the additive may or may not dissolve the polymer by itself. Concentration of the additive in the extrusion mixture may range from about 1 weight percent to about 20 weight percent or from about 1 weight percent to about 10 weight percent.

For some embodiments, a spinning process fabricates hollow fiber 36 by extruding a mixture of the polymer (e.g., the polysulfone) in solution along with a non-solvent for the polymer through interior bore 37 such that phase separation is induced at interior bore 37 of the nascent hollow fiber, facilitating forming of the asymmetry with a skin layer on the interior bore side of hollow fiber 36. Examples of suitable spinning solvents that can also be used for bore-fluid mixtures include N-methyl-2-pyrrolidone (NMP), dimethylformamide (DMF), dimethylacetamide (DMAc) and dimethyl sulfoxide (DMSO). These solvents provide miscibility in water (a suitable non-solvent and quench medium) that is adequate to promote rapid phase separation when the extrusion mixture is contacted with an aqueous media while spinning.

Concentration of the polymer in the extrusion mixture influences pore size and porosity given that pore size and porosity increase as the concentration of the polymer in the extrusion mixture decreases. Skin layer 50 forms due to relative increase in the concentration of the polymer toward where the solvent leaves during formation of hollow fiber 36 and upon exiting of the extrusion mixture from a spinneret nozzle. Also, due to evaporation of constituents other than the polymer, volatility of the constituents in the mixture influences concentration gradient of the polymer present at time of the quenching and across hollow fiber 36 from skin layer 50 to substructure 52.

In some embodiments, the additive enhances the evaporation where skin layer 50 forms by having a boiling point below 100° C. Examples of an additive that are capable of dissolving the polymer for some embodiments include acetone and tetrahydrofuran (THF). For some embodiments, the extrusion mixture includes an additive such as ethanol, which functions as a non-solvent for the polymer. Such non-solvent compounds used as the additive result in the evaporation that maintains the extrusion mixture in a homogenous and stable state such that quenching produces lower pore sizes relative to quenching of the extrusion mixture after solvent-based evaporation, which causes the extrusion mixture to become less stable prior to quenching.

In addition to including the additive that is more volatile than the solvent, various parameters enable further modifying asymmetrical forming of hollow fiber 36 in order to control mass transfer through the membrane and liquid wetting of hollow fiber 36. For example, residence time that the mixture is exposed to ambient air prior to quenching in the aqueous media determines an amount of evaporation allowed and hence how much the polymer is concentrated at skin layer 50 due to the evaporation. Temperature of the mixture exiting the spinneret nozzle and surrounding air conditions including humidity, presence of vapors, temperature and air flow, such as rate, may further influence the formation and formation characteristics of a skin layer.

Figure 6:
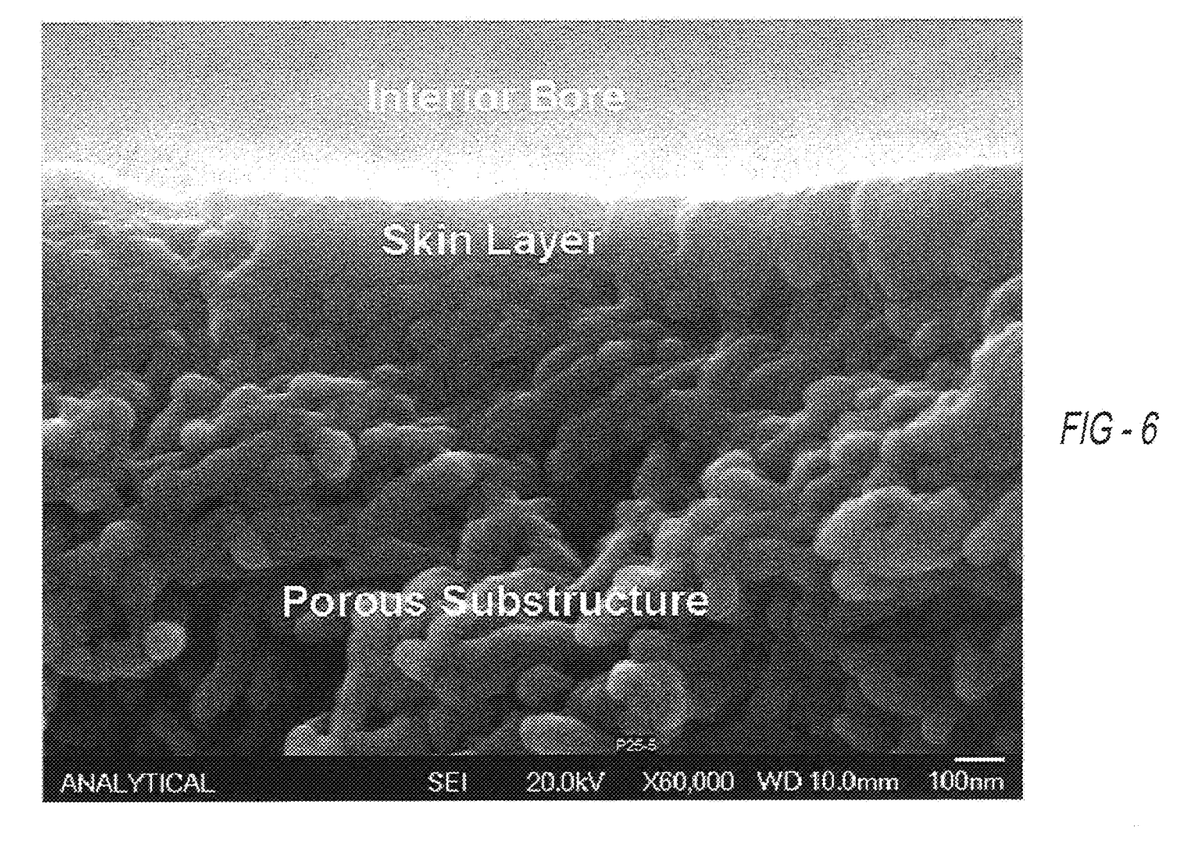
FIG. 6 is a depiction of skin layers of a hollow fiber that may include PTFE particles according teachings of the present disclosure.
Figure 7:
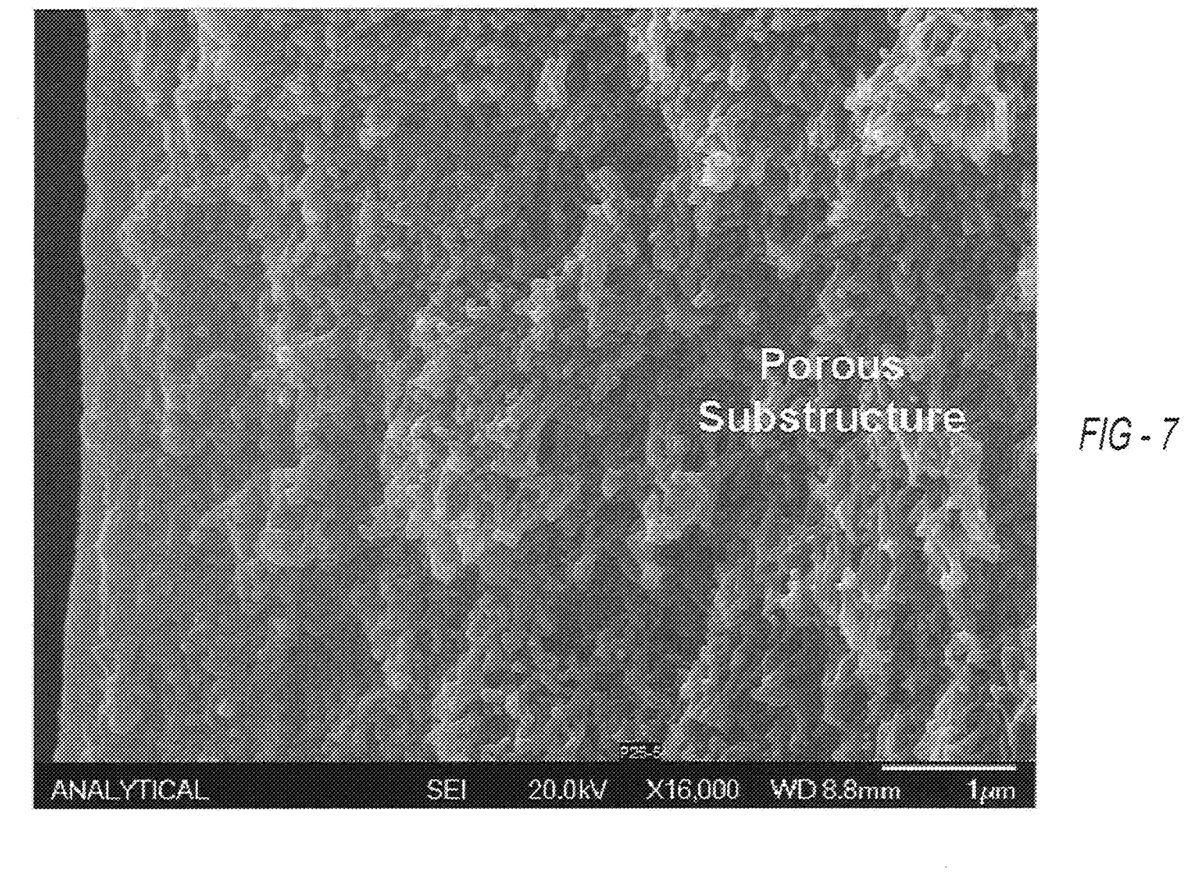
FIG. 7 is a depiction of skin layers of a hollow fiber that may include PTFE particles according teachings of the present disclosure.

One method of creating hollow fiber 36 is to start with a homogeneous polymer solution containing 20 wt. % polysulfone, 74 wt. % NMP, 5 wt. % PTFE, and 1 wt. % fluorinated surfactant and then beginning extruding. Extruding may begin at 30° C., and at an extrusion rate of 600 ml/hr, through a spinneret annulus at 30° C. Through the bore of the spinneret, a bore fluid containing water may be coextruded at 450 ml/hr. The extruded fluids may pass through an air-gap of ~0.5 cm into a 40° C. quench bath containing 30 wt. % NMP and 70 wt. % water. The hollow fiber formed during the process may be collected over a collection drum at 12 m/min. FIG. 3 depicts a cross section of an example of a hollow fiber that may be collected upon completion of the process. Skin layers on or about interior bore 37 of hollow fibers as depicted in FIG. 6 and FIG. 7 are useful for passing liquid solvents in a flow path defined by the interior bore.

In one example, a hollow fiber bundle was created by assembling four (4) fibers into a 0.25-inch module with an active fiber length of ~13 cm. The total surface area of the hollow fibers was ~20 sq. cm. Using pure gases, the permeance of carbon dioxide and nitrogen through the hollow fibers was measured to be 700 GPU and 752 GPU respectively, where 1 GPU is defined as $1\times10\text{-}6$ cc(STP)/cmHg·sec·cm2. The relatively high gas permeance may be a result of the asymmetric structure that constitutes the hollow fiber membrane contactor.

In another example, a hollow fiber bundle was created by assembling 20 fibers into a 0.5-inch module with an active fiber length of ~13.5 cm. The total surface area of the hollow fibers was ~102 sq. cm. A gas mixture containing ~18% carbon dioxide and balance nitrogen was passed through the exterior of the hollow fiber bundle at a rate of ~140 ml/min. On the opposite side of the hollow fiber, a solvent containing ~3% monoethanolamine by weight in water was passed countercurrently through the interior bore of the hollow fibers at ~30 ml/min. Although the amine content in the solution was relatively low, the carbon dioxide content in the gas mixture on the exterior of the hollow fibers was reduced from ~18% to about 9.5%.

Particle size of particulate 38 may range from one nanometer, one micron, three micron, five micron, eight micron or even ten microns and may be smaller than the pores through the wall of hollow fiber 36 to avoid inhibiting mass transfer across the wall of hollow fiber 36.

Particles 38 may disperse on at least a surface of hollow fiber 36 in contact with liquids, such as the lean or rich sorbent 22, 26. PTFE particles may be particulates 38 and may be also homogeneously dispersed within and throughout hollow fiber 36 as depicted in FIG. 3 and FIG. 5. Influence on the hydrophobic properties of hollow fiber 36 may derive from chemical composition of particulate 38 and/or altering texture or morphology of the surface of hollow fiber 36 due to particulate 38. For example, surface roughening increases hydrophobic tendency of hollow fiber 36 if already at least somewhat hydrophobic based on the polymer selected.

In some embodiments, the extrusion mixture includes particulate 38 that is not dissolved in the solvent but rather suspended as solids in the mixture for incorporation into hollow fiber 36 to influence the wetting properties thereof. Preparing hollow fiber 36 by spinning a composition doped with particulate 38 disperses particulate 38 throughout hollow fiber 36. Some of particulate 38 thus are fixed in position and exposed on the inner and/or outer surfaces of hollow fiber 36 upon formation of hollow fiber 36.

Some embodiments may apply particulate 38 as a coating on an exterior skin layer of hollow fiber 36 in addition to being homogenously dispersed throughout hollow fiber 36, as evident in FIG. 2 and FIG. 3. Particulate 38 may coat an inside surface of hollow fiber 36, an outside surface of hollow fiber 36 or both the inside and outside surfaces of hollow fiber 36.

For example, a method of depositing a layer of particulate 38 on a surface of hollow fiber 36 may include mixing materials that provide particulate 38 with a fluid to form a suspension. The materials that provide particulate 38 thus disperse in the fluid, such as water, which does not dissolve or degrade the material or a precursor spun from the polymer. Contacting the precursor for hollow fiber 36 with the suspension results in the materials that provide particulate 38 migrating and adhering to the precursor in order to provide hollow fiber 36 coated with particulate 38. Flowing of the suspension through an interior of the precursor may thereby coat an inner surface of hollow fiber 36 with particulate 38. Once the precursor is contacted with the suspension and thereby loaded with the material, including particulate 38, hollow fiber 36 may be dried to remove any of the fluid that remains.

In one embodiment of the present teachings, a section of length of hollow fiber 36 that has a homogenous or non-homogeneous distribution of PTFE particles disbursed throughout its structure, may be comprised of 1 wt. percent of fluorinated surfactant, 20 wt. percent of polymer matrix, 5 wt. percent of PTFE particles, and 74 wt. percent of NMP. Polysulfone may be the polymer matrix used and the combination of the polymer matrix and PTFE is what prevents or lessens solvent wetting. The polymer matrix and PTFE may be mixed before spinning of hollow fiber 36 occurs.

Figure 8:
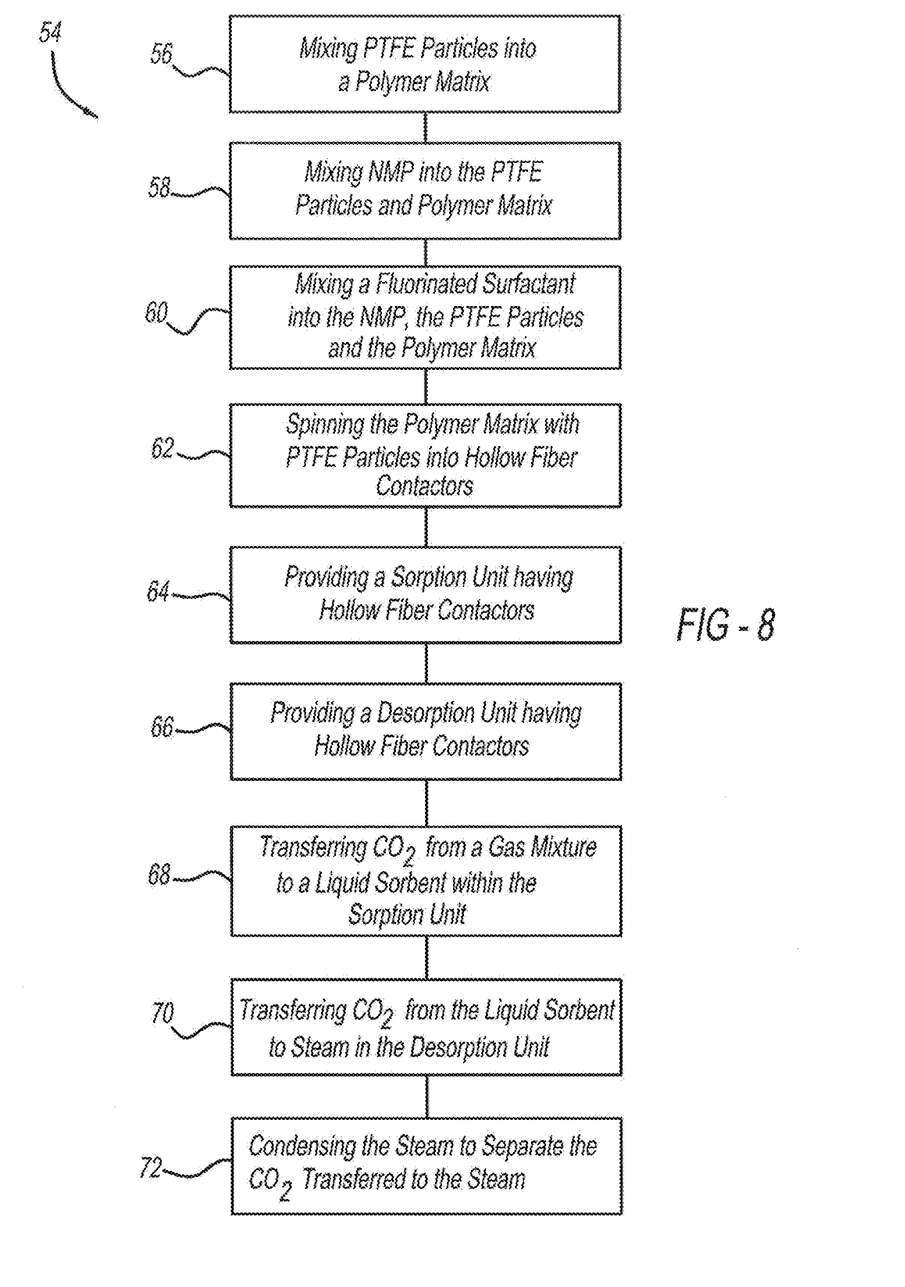
FIG. 8 is a flowchart depicting an example of process steps in creating a hollow fiber contactor with fluorinated particles in accordance with the present teachings.

FIG. 8 depicts a flowchart 54, which will be used to explain further variations of methods of the present teachings. Steps presented below may or may not be in the order described, or depicted as in FIG. 8. At step 56, the method may include mixing a plurality of polytetrafluoroethylene particles into a polymer matrix, such as polysulfone, thereby causing homogeneous dispersing of polytetrafluoroethylene particles 38 in the polymer matrix. At step 58 the method may include mixing NMP into the polytetrafluoroethylene particles and the polymer matrix, which may be polysulfone. At step 60 the method may include mixing a fluorinated surfactant into the NMP, the plurality of polytetrafluoroethylene particles and the polymer matrix, thereby forming a mixed composition. Mixing the fluorinated surfactant into the NMP, the plurality of polytetrafluoroethylene particles and the polymer matrix, may be done after mixing the NMP, the plurality of polytetrafluoroethylene particles and the polymer matrix to facilitate homogeneous dispersing of the polytetrafluoroethylene throughout the mixed composition prior to spinning into a hollow fiber, for example. The polytetrafluoroethylene particles may be homogeneously dispersed in the polymer matrix as a result of including the fluorinated surfactant as part of the mixing process. The plurality of polytetrafluoroethylene particles may be about 5 wt. %, the polymer matrix is about 25 wt. %, the fluorinated surfactant is about 1 wt. %, and the NMP is about 69 wt. % in the composition.

At step 62, the method may include spinning the composition doped with the polytetrafluoroethylene particles into a plurality of hollow fiber contactors. The hollow fiber contactors may be employed by passing a gas containing at least one of carbon dioxide and hydrogen sulfide along the plurality of hollow fiber contactors, and by passing a liquid sorbent for at least one of the carbon dioxide and the hydrogen sulfide along the contactors such that contacting of the gas and the liquid sorbent to treat the gas occurs along walls of the plurality of hollow fiber contactors, such as along their lengths. The hollow fiber contactors may incorporate particles, such as PTFE particles, distinct in composition from a remainder of the walls of the hollow fiber contactors to influence wetting properties of the hollow fiber contactors.

At step 64, the method may further include providing a sorption unit having a first hollow fiber contactor of a plurality of hollow fibers in fluid communication with a sorbent and a mixture containing at least one of carbon dioxide and hydrogen sulfide for transfer of at least one of the carbon dioxide and the hydrogen sulfide through pores of the first hollow fiber contactor to the sorbent, which may not pass through a wall of the first hollow fiber contactor or unsuitably wet the first hollow fiber contactor. At step 66, the method may further include providing a desorption unit having a second hollow fiber contactor of the plurality of hollow fibers in fluid communication with a circulation flow path loop that couples the sorption and desorption units with the sorbent. At step 68, the method may include transferring carbon dioxide from a gas mixture to a liquid sorbent through a first hollow fiber contactor of the plurality of hollow fibers that incorporates the polytetrafluoroethylene particles to influence wetting properties of the first hollow fiber contactor. At step 70, the method may include transferring the carbon dioxide from the liquid sorbent to steam through the second hollow fiber contactor of the plurality of hollow fibers that incorporates the polytetrafluoroethylene particles to influence wetting properties of the second hollow fiber contactor. At step 72, the method may include condensing the steam, which may be laden with carbon dioxide, to separate the carbon dioxide transferred to the steam.

Within sorption unit 12, the gas mixture may contain carbon dioxide for transfer of the carbon dioxide through the pores and the entire wall thickness of the first hollow fiber contactor to the sorbent on an opposite side of the wall of the first hollow fiber contactor. Polytetrafluoroethylene particles may also be disposed on sorbent contacting surfaces of the first and second hollow fiber contactors. The method may further include coating interior and/or exterior surfaces of the first and second hollow fiber contactors with polytetrafluoroethylene particles. The walls of the first and second hollow fiber contactors may be formed of polymer material and polytetrafluoroethylene particles may be dispersed on a surface of the polymer material. Polytetrafluoroethylene particles may be about 5 wt. %, the polymer matrix may be about 20 wt. %, the fluorinated surfactant may be about 1 wt. %, and the NMP may be about 74 wt. % in the composition. Alternatively, polytetrafluoroethylene particles may be about 5 wt. %, the polymer matrix may be about 25 wt. %, the fluorinated surfactant may be about 1 wt. %, and the NMP may be about 69 wt. % in the composition. Alternatively, the plurality of polytetrafluoroethylene particles may be in the range of 1-10 wt. %, the polymer matrix may be in the range of 15-30 wt. %, the fluorinated surfactant may be in the range of 0-3 wt. %, and the NMP may be present in a range of 57-84 wt. % in the composition to complete a 100% total composition of polytetrafluoroethylene particles, polymer matrix, fluorinated surfactant, and NMP. Lower and upper wt. % in the ranges presented above may be inclusive.

The method may further include passing a gas containing at least one of carbon dioxide and hydrogen sulfide along the plurality of hollow fiber contactors, and passing a liquid sorbent for at least one of the carbon dioxide and the hydrogen sulfide along the contactors such that contacting of the gas and the liquid sorbent to treat the gas occurs across walls of the plurality of hollow fiber contactors.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method, comprising:
   mixing a plurality of polytetrafluoroethylene particles into a polymer matrix;
   mixing NMP into the polytetrafluoroethylene particles and the polymer matrix;
   mixing a fluorinated surfactant into the NMP, the plurality of polytetrafluoroethylene particles and the polymer matrix and causing the polytetrafluoroethylene particles to become dispersed in the polymer matrix; and
   spinning the polymer matrix with the polytetrafluoroethylene particles to create a plurality of hollow fiber contactors.

2. The method according to claim 1, wherein the polymer matrix is polysulfone.

3. The method according to claim 1, wherein the polytetrafluoroethylene particles are homogeneously dispersed in the polymer matrix.

4. The method according to claim 1, further comprising:
   providing a sorption unit having a first hollow fiber contactor of the plurality of hollow fibers in fluid communication with a sorbent and a mixture containing at least one of carbon dioxide and hydrogen sulfide for transfer of at least one of the carbon dioxide and the hydrogen sulfide through pores of the first hollow fiber contactor to the sorbent; and
   providing a desorption unit having a second hollow fiber contactor of the plurality of hollow fibers in fluid communication with a circulation flow path loop that couples the sorption and desorption units with the sorbent.

5. The method according to claim 1, further comprising:
   transferring carbon dioxide from a gas mixture to a liquid sorbent through a first hollow fiber contactor of the plurality of hollow fibers that incorporates the polytetrafluoroethylene particles to influence wetting properties of the first hollow fiber contactor;
   transferring the carbon dioxide from the liquid sorbent to steam through a second hollow fiber contactor of the plurality of hollow fibers that incorporates the polytetrafluoroethylene particles to influence wetting properties of the second hollow fiber contactor; and
   condensing the steam to separate the carbon dioxide transferred to the steam.

6. The method according to claim 5, wherein the gas mixture contains the carbon dioxide for transfer of the carbon dioxide through the pores of the first hollow fiber contactor to the sorbent.

7. The method according to claim 5, wherein:
   the polytetrafluoroethylene particles are disposed on sorbent contacting surfaces of the first and second hollow fiber contactors, and
   the walls of the first and second hollow fiber contactors are formed with the polymer material and the polytetrafluoroethylene particles are dispersed within the polymer matrix and on a surface of the polymer material.

8. The method according to claim 1, wherein the plurality of polytetrafluoroethylene particles is about 5 wt. %, the polymer matrix is about 20 wt. %, the fluorinated surfactant is about 1 wt. %, and the NMP is about 74 wt. % in the composition.

9. The method according to claim 1, further comprising:
   passing a gas containing at least one of carbon dioxide and hydrogen sulfide along the plurality of hollow fiber contactors; and
   passing a liquid sorbent for at least one of the carbon dioxide and the hydrogen sulfide along the contactors such that contacting of the gas and the liquid sorbent to treat the gas occurs at wall surfaces of the plurality of hollow fiber contactors.

10. The method according to claim 1, wherein the hollow fiber contactors incorporate polytetrafluoroethylene particles that are distinct in composition from a remainder of the walls to influence wetting properties of the contactors.

11. The method according to claim 4, further comprising:
    coating exterior surfaces of the first and second hollow fiber contactors with polytetrafluoroethylene particles.

12. The method according to claim 1, wherein the plurality of polytetrafluoroethylene particles is 1-10 wt. %, the polymer matrix is 15-30 wt. %, the fluorinated surfactant is 0-3 wt. %, and the NMP is 57-84 wt. % in the composition.

* * * * *